US011358239B2

(12) United States Patent
Jones et al.

(10) Patent No.: US 11,358,239 B2
(45) Date of Patent: Jun. 14, 2022

(54) METHOD FOR ADDITIVELY MANUFACTURING A THREE-DIMENSIONAL ARTICLE

(71) Applicant: The Boeing Company, Chicago, IL (US)

(72) Inventors: Jonaaron F. Jones, Knoxville, TN (US); David M. Dietrich, Knoxville, TN (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 16/402,466

(22) Filed: May 3, 2019

(65) Prior Publication Data

US 2019/0255656 A1 Aug. 22, 2019

Related U.S. Application Data

(62) Division of application No. 14/679,201, filed on Apr. 6, 2015, now Pat. No. 10,322,470.

(51) Int. Cl.
*B23K 26/342* (2014.01)
*B33Y 10/00* (2015.01)
(Continued)

(52) U.S. Cl.
CPC .............. *B23K 26/342* (2015.10); *B22F 7/08* (2013.01); *B22F 12/00* (2021.01); *B23K 26/144* (2015.10);
(Continued)

(58) Field of Classification Search
CPC .. B22F 2003/1056; B22F 3/1055; B22F 7/08; B23K 26/0081; B23K 26/046;
(Continued)

(56) References Cited

U.S. PATENT DOCUMENTS 5,334,816 A * 8/1994 Sugiyama ............ B23K 26/032
219/121.75
6,405,095 B1 * 6/2002 Jang ....................... B22F 1/0003
700/118
(Continued)

FOREIGN PATENT DOCUMENTS

CN 101815607 8/2010
EP 0554523 8/1993
(Continued)

OTHER PUBLICATIONS

China National Intellectual Property Administration, "Notification of Second Office Action," with English translation, App. No. 201610205800.6 (dated Jul. 15, 2019).
(Continued)

*Primary Examiner* — Ibrahime A Abraham
*Assistant Examiner* — Chris Q Liu
(74) *Attorney, Agent, or Firm* — Walters & Wasylyna LLC

(57) ABSTRACT

A method for additively manufacturing a three-dimensional article includes depositing feed materials through a material feeder to a growth surface. The feed materials include at least one of a first feed material, a second feed material and a third feed material. At least one of the first feed material, the second feed material and the third feed material is different. The method also includes exposing the feed materials to electromagnetic energy to form a melt pool. The melt pool includes at least one of a molten first feed material, a molten second feed material and a molten third feed material. The method further includes solidifying the melt pool.

20 Claims, 7 Drawing Sheets

(51) Int. Cl.
*B23K 26/354* (2014.01)
*C23C 24/10* (2006.01)
*B22F 7/08* (2006.01)
*B23K 26/144* (2014.01)
*B29C 64/209* (2017.01)
*B33Y 70/00* (2020.01)
*B33Y 30/00* (2015.01)
*B22F 12/00* (2021.01)
*B22F 10/10* (2021.01)

(52) U.S. Cl.
CPC .......... *B23K 26/354* (2015.10); *B29C 64/209* (2017.08); *B33Y 10/00* (2014.12); *B33Y 30/00* (2014.12); *C23C 24/10* (2013.01); *C23C 24/106* (2013.01); *B22F 10/10* (2021.01); *B33Y 70/00* (2014.12); *Y02P 10/25* (2015.11)

(58) Field of Classification Search
CPC .. B23K 26/1464; B23K 26/34; B23K 26/342; B23K 26/144; B23K 26/354; B29C 67/0074; B29C 67/0077; B29C 67/0085; B33Y 10/00; B33Y 30/00; B33Y 70/00; C23C 24/10; C23C 24/106; Y02P 10/295
USPC .............. 219/73.11, 76.1–77, 13.21, 121.15, 219/121.16, 121.12
See application file for complete search history.

(56) References Cited

U.S. PATENT DOCUMENTS

| | | | |
|---|---|---|---|
| 2003/0010409 A1* | 1/2003 | Kunze | C04B 35/581 148/513 |
| 2012/0199564 A1* | 8/2012 | Washko, Jr. | B23K 26/34 219/121.63 |
| 2013/0319325 A1 | 12/2013 | Whitfield et al. | |
| 2014/0015172 A1 | 1/2014 | Sidhu et al. | |
| 2014/0099476 A1 | 4/2014 | Subramanian et al. | |
| 2014/0263196 A1* | 9/2014 | Daum | B23K 26/342 219/76.14 |
| 2015/0021379 A1 | 1/2015 | Albrecht et al. | |

FOREIGN PATENT DOCUMENTS

| WO | WO 2012/131327 | 10/2012 |
|---|---|---|
| WO | WO 2013/174449 | 11/2013 |
| WO | WO 2015/040433 | 3/2015 |

OTHER PUBLICATIONS

China National Intellectual Property Administration, "Notification of Third Office Action," with English translation, App. No. 201610205800.6 (dated Dec. 19, 2019).

China National Intellectual Property Administration, Office Action, with English translation, App. No. 201610205800.6 (dated Aug. 4, 2020).

"Additive Manufacturing—Repair, Build Up and Geometrical Modifications by Laser Deposition Welding," Fraunhofer Institute for Production Technology IPT.

Japan Patent Office, Office Action, with English translation, App. No. 2016-074510 (dated Mar. 17, 2020).

Japan Patent Office, Office Action, with English translation, App. No. 2016-074510 (dated Jul. 21, 2020).

China National Intellectual Property Administration, Office Action, with English translation, App. No. 201610205800.6 (dated Nov. 17, 2020).

* cited by examiner

METHOD FOR ADDITIVELY MANUFACTURING A THREE-DIMENSIONAL ARTICLE

PRIORITY

This application is a divisional of U.S. Ser. No. 14/679,201 filed on Apr. 6, 2015.

FIELD

The present disclosure is generally related to additive manufacturing and, more particularly, to a deposition head for additive manufacturing capable of depositing structurally different and/or compositionally different feed materials.

BACKGROUND

Additive manufacturing, or "3D Printing," is a manufacturing process in which an additive manufacturing system (e.g., a 3D printer) autonomously fabricates an object based on a three-dimensional model, or other digital representation, of a three-dimensional object. Additive manufacturing systems fabricate, or print, the object by depositing, or otherwise forming, a constituent material in the shape of the object until it is formed. In one common example, successive layers of material, that represent cross-sections of the object, are deposited and the deposited layers of material are fused, or otherwise solidified, to build up the final object. The final three-dimensional object is fully dense and can include complex shapes.

A typical additive manufacturing process includes depositing a base material onto a growth surface (e.g., initially onto a substrate and later onto a previously deposited layer of base material) and directing an energy source onto the growth surface to form a melt pool on the growth surface. The base material is deposited into and incorporated by the melt pool to provide additional material to the object layer-by-layer.

One type of additive manufacturing process forms a large melt pool deposition. Such a process may quickly create an object having a near net shape; however, this process requires post process machining to achieve the final three-dimensional shape of the object, effectively increasing the time and cost to produce the object. Another type of additive manufacturing process forms a small melt pool deposition. Such a process may allow for precise deposition to achieve the final three-dimensional shape of the object (e.g., only requiring finishing machining); however, the process is slow and requires multiple passes to form the final object, effectively increasing the time and cost to produce the object.

Accordingly, those skilled in the art continue with research and development efforts in the field of additive manufacturing of three-dimensional objects.

SUMMARY

In one embodiment, the disclosed deposition head for additive manufacturing may include a material feeder including a first feeder to deposit a first feed material to a growth surface, and a second feeder to deposit a second feed material to the growth surface, and an electromagnetic energy source to direct electromagnetic energy to the growth surface, wherein the electromagnetic energy forms a melt pool on the growth surface, and wherein the melt pool may include at least one of a molten first feed material and a molten second feed material.

In another embodiment, the disclosed additive manufacturing apparatus may include a build platform to support a growth surface, and a deposition head movable relative to the build platform, the deposition head may include a first feeder to deposit a first feed material to the growth surface, and a second feeder to deposit a second feed material to the growth surface, and an electromagnetic energy source to direct electromagnetic energy to the growth surface, wherein the electromagnetic energy forms a melt pool on the growth surface, and wherein the melt pool may include at least one of a molten first feed material and a molten second feed material.

In another embodiment, the disclosed method for additively manufacturing a three-dimensional article may include the steps of: (1) depositing feed materials through a material feeder to a growth surface, wherein the feed materials include at least one of a first feed material, a second feed material and a third feed material, and wherein at least one of the first feed material, the second feed material and the third feed material is different, (2) exposing the feed materials to electromagnetic energy to form a melt pool, wherein the melt pool includes at least one of a molten first feed material, a molten second feed material and a molten third feed material, and (3) solidifying the melt pool.

In yet another embodiment, the disclosed method for additively manufacturing a three-dimensional article may include the steps of: (1) dispensing a powder feedstock through a powder guide formed in a sidewall of a housing of a deposition head; (2) dispensing a wire feedstock through a wire guide formed in the sidewall of the housing, separate from the powder guide; (3) positioning an optic, located within the housing, relative to a laser, located within the housing; and (4) heating a portion of at least one of the powder feedstock and the wire feedstock using a laser beam, emitted by the laser and passing through the optic, to form a melt pool.

Other embodiments of the disclosed systems and method will become apparent from the following detailed description, the accompanying drawings and the appended claims.

DETAILED DESCRIPTION

Figure 1:
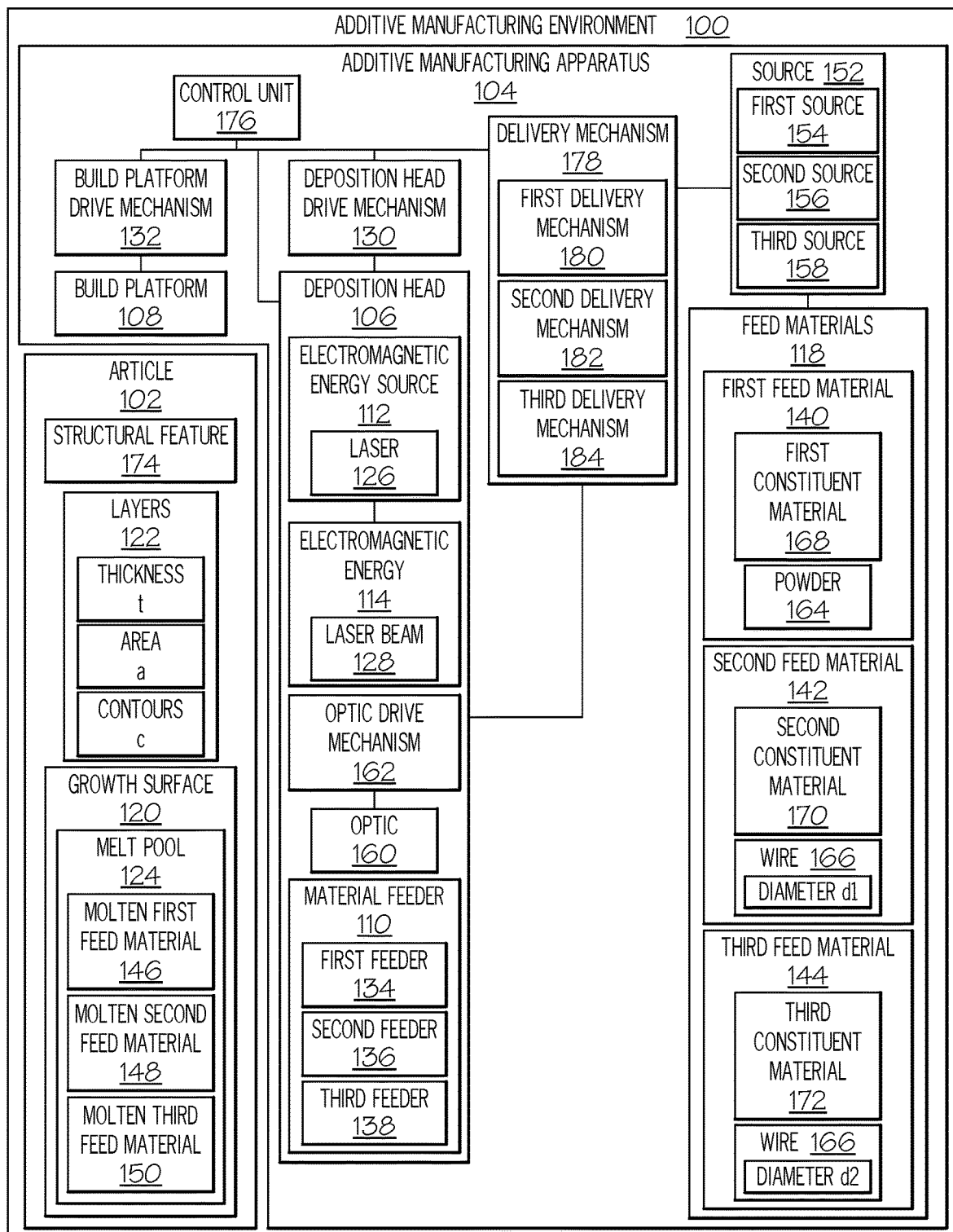
FIG. 1 is block diagram of one embodiment of the disclosed additive manufacturing environment.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of additive manufacturing environment, generally designated 100, is disclosed. Three-dimensional article, generally designated "article" 102, may be manufactured by additive manufacturing apparatus, generally designated "apparatus" 104.

As used herein, the term "article" refers to any three-dimensional object, workpiece, part, component, product or the like having almost any shape or geometry (e.g., complex shapes and/or geometries) and produced by an additive manufacturing process. An additive manufacturing process includes any process or operation for manufacturing the three-dimensional article in which successive layers of a base material are laid down, for example, under computer control.

Figure 2:
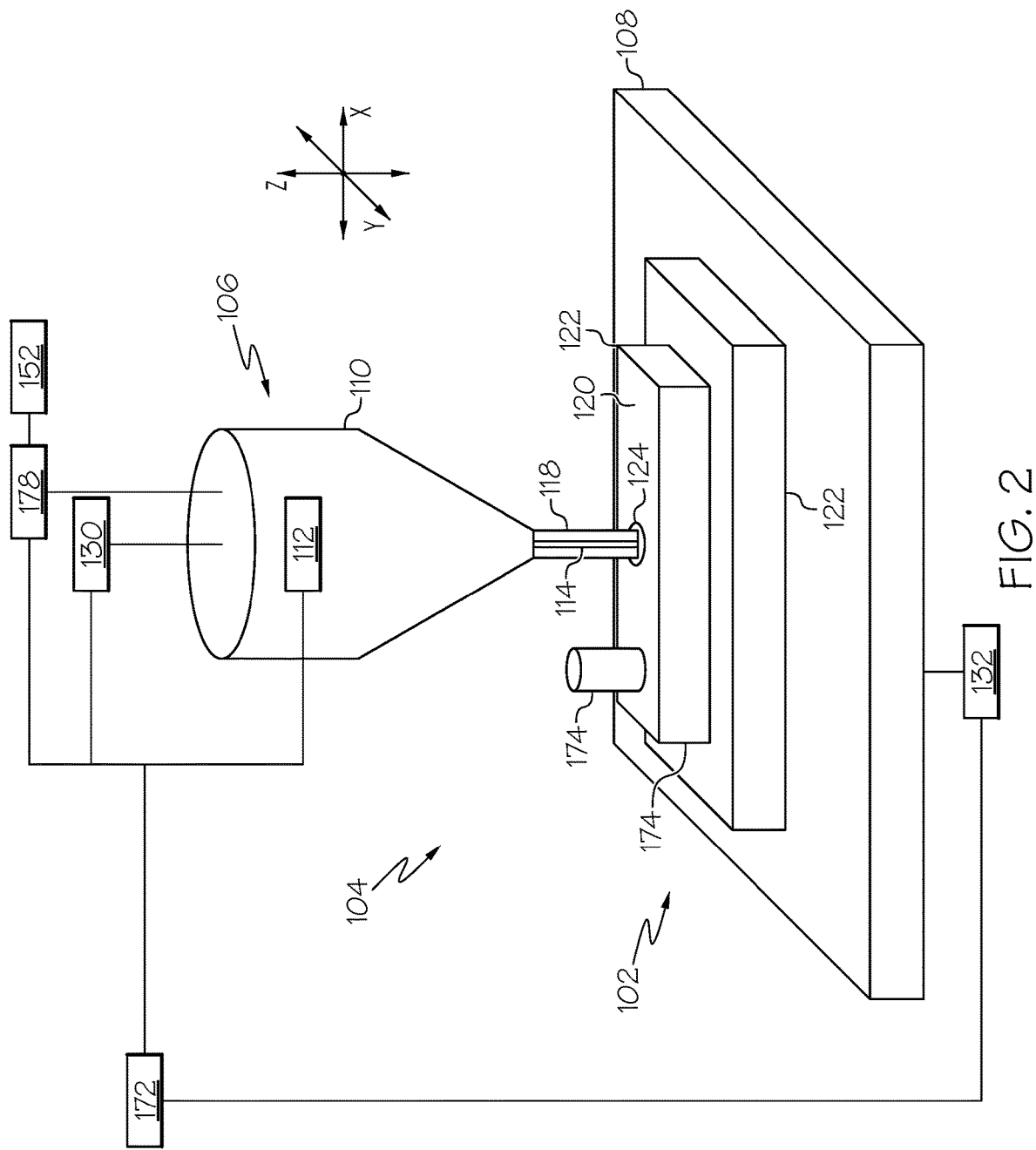
FIG. 2 is a schematic perspective view of one embodiment of the disclosed additive manufacturing apparatus of FIG. 1.

Referring to FIGS. 1 and 2, one embodiment of additive manufacturing apparatus 104 may include deposition head 106 and build platform 108. Article 102 may be supported on build platform 108 during fabrication. Build platform 108 may include a base plate, a substrate or any other suitable build surface to support layers of feed materials 118 and article 102, additively manufactured thereon. Deposition head 106 may include material feeder 110. Material feeder 110 may be configured to deposit one or more feed materials 118 (e.g., a plurality of different types of base materials) to form growth surface 120. Deposition head 106 may include electromagnetic energy source 112. Electromagnetic energy source 112 may generate and/or emit electromagnetic energy 114 capable of irradiating feed materials 118 to form a localized melt pool 124 on growth surface 120. Article 102 may be manufactured by successive addition of layers 122 of feed materials 118 having a predetermined thickness t, area a, and/or contour c (FIG. 1), which are melted by electromagnetic energy 114 directed to growth surface 120 from electromagnetic energy source 112.

Electromagnetic energy 114 may include a concentrated beam of directed electromagnetic radiation or energy (e.g., an energy beam for energy irradiation or a laser beam for laser irradiation). As one general, non-limiting example, electromagnetic energy source 112 may include laser 126 (e.g., a laser beam generator). Laser 126 may generate and/or emit laser beam 128 (e.g., electromagnetic energy 114) capable of selectively melting feed materials 118. As one specific, non-limiting example, laser 126 may include a fiber laser, for example, a 5 kW fiber laser. As another general, non-limiting example, electromagnetic energy source 112 may include an electron beam generator (not explicitly illustrated) configured to generate and/or emit an electron beam (e.g., electromagnetic energy 114) capable of selectively melting feed materials 118.

As one example, the additive manufacturing technique disclosed herein (e.g., apparatus 104 and/or method 300) may be selective laser melting ("SLM"). As another example, the additive manufacturing technique disclosed herein (e.g., apparatus 104 and/or method 300) may be selective laser sintering ("SLS"). As another example, the additive manufacturing technique disclosed herein (e.g., apparatus 104 and/or method 300) may be electron beam melting ("EBM").

Referring to FIG. 2, and with reference to FIG. 1, as one example, one or more feed materials 118 may initially be deposited, from material feeder 110, on a surface of build platform 108 to form growth surface 120. Electromagnetic energy 114 may be directed at feed materials 118, for example, at a selected location on build platform 108, to form melt pool 124 (e.g., a molten puddle of feed materials 118) on growth surface 120. Subsequent layers of one or more feed materials 118 may be deposited onto the previously grown (e.g., built up) material layer and integrated within melt pool 124 (e.g., by melting and forming a solution within melt pool 124) on growth surface 120. Introduction of additional feed materials 118 may force a portion of the original melt pool 124 to solidify (e.g., cool) at a melt pool-growth surface interface, thereby forming a new material layer and building up growth surface 120.

Referring to FIG. 2, deposition head 106 may be movable relative to growth surface 120 (e.g., article 102 or build platform 108), for example, during fabrication of article 102. Movement of deposition head 106 relative to growth surface 120 may facilitate successive layering of feed materials 118 and/or appropriately deposit feed material 118, position electromagnetic energy 114 and/or move the location of melt pool 124 on growth surface 120.

As one example, deposition head 106 may be linearly movable to growth surface 120. For instance, deposition head 106 may be linearly moved along an X-axis, a Y-axis, a Z-axis or a combination thereof. As another example, deposition head 106 may be rotatably moveable relative to growth surface 120. For instance, deposition head 106 may be rotatably moved about the X-axis, the Y-axis, the Z-axis or a combination thereof. As yet another example, deposition head 106 may be non-linearly movable relative to growth surface 120. For instance, deposition head 106 may be freely moved relative to growth surface 120, for example, to form article 102 having complex shapes.

Apparatus 104 may include deposition head drive mechanism 130. Deposition head drive mechanism 130 may be operatively coupled to deposition head 106. As general, non-limiting examples, deposition head drive mechanism 130 may include any suitable mechanical, electro-mechanical, hydraulic or pneumatic mechanism configured to drive motion (e.g., linear, rotatable, and/or non-linear) of deposition head 106 relative to article 102 (e.g., relative to growth surface 120). As other general, non-limiting examples, deposition head drive mechanism 130 may include robotic mechanisms, end-effectors, autonomous vehicles and/or other related technologies configured to drive motion of electromagnetic radiation source 112 relative to article 102.

In addition to, or alternatively, build platform 108 may be movable relative to deposition head 106, for example, during fabrication of article 102. Movement of build platform 108 relative to deposition head 106 may facilitate successive layering of feed materials 118 and/or appropriately position growth surface 120, for example, to deposit feed materials 118, to locate the directed electromagnetic energy 114 and/or move the location of melt pool 124.

As one example, build platform 108 may be linearly movable, for example, relative to deposition head 106. For instance, build platform 108 may be linearly moved along the X-axis, the Y-axis, the Z-axis or a combination thereof. As another example, build platform 108 may be rotatably moveable, for example, relative to deposition head 106. For instance, build platform 108 may be rotatably moved about the X-axis, the Y-axis, the Z-axis or a combination thereof. As yet another example, build platform 108 may be non-linearly movable, for example, relative to deposition head 106. For instance, build platform 108 may be freely moved relative to deposition head 106.

Apparatus 104 may include build platform drive mechanism 132. Build platform driving mechanism 132 may be operatively coupled to build platform 108. As general, non-limiting examples, build platform driving mechanism 132 may include any suitable mechanical, electro-mechanical, hydraulic or pneumatic mechanism configured to drive motion (e.g., linear, rotatable and/or non-linear) of build platform 108 relative to deposition head 106. As other general, non-limiting examples, build platform drive mechanism 132 may include robotic mechanisms, end-effectors, autonomous vehicles and/or other related technologies configured to drive motion of build platform 108.

Figure 3:
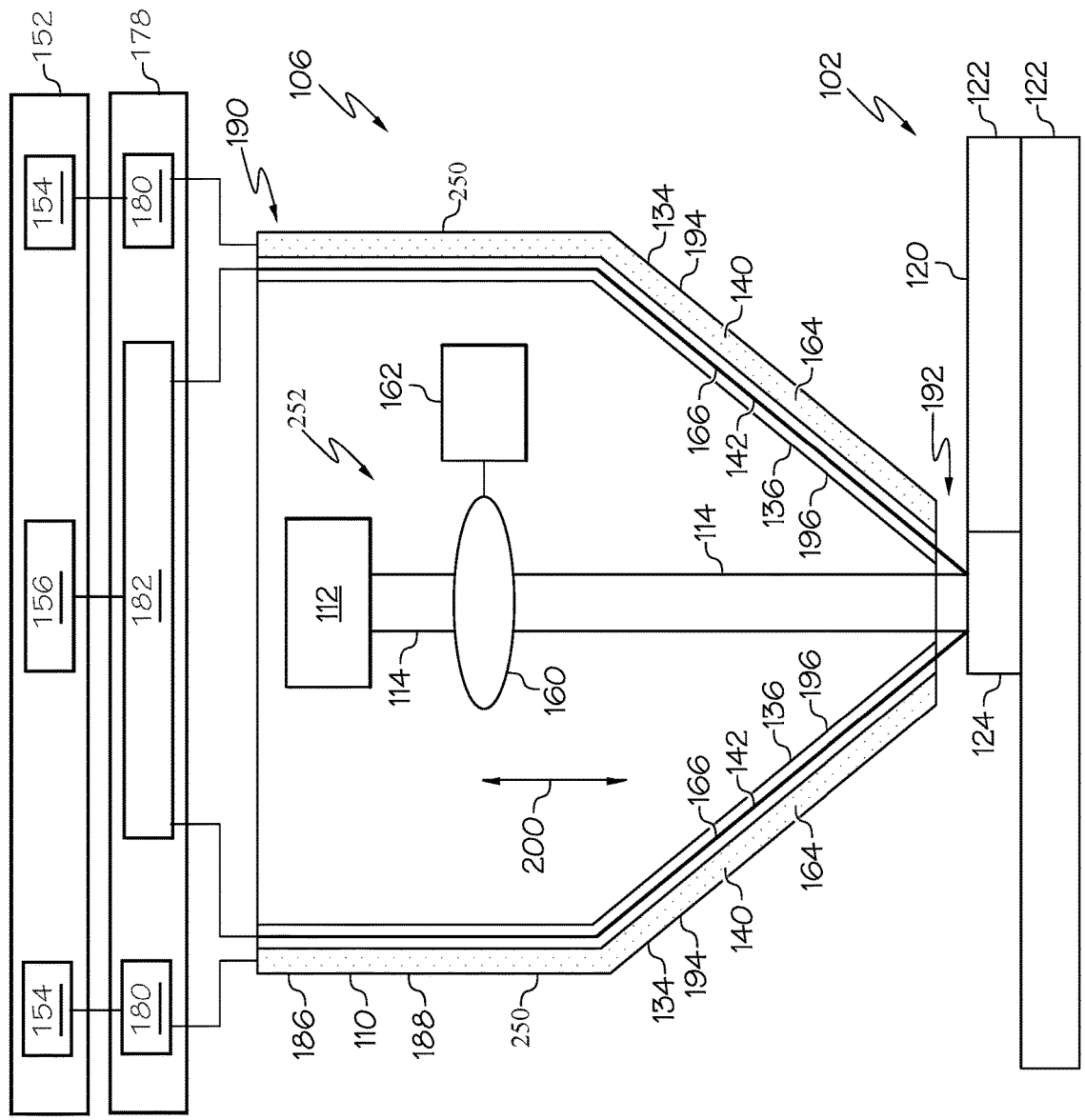
FIG. 3 is a schematic side elevational view, in section, of one embodiment of the disclosed deposition head for the additive manufacturing apparatus of FIG. 1.

Referring to FIG. 3, and with reference to FIG. 1, in one embodiment of deposition head 106, material feeder 110 may include first feeder 134 and second feeder 136. First feeder 134 may be configured to selectively deposit first feed material 140 to growth surface 120 (e.g., introduce first feed material 140 to melt pool 124). Second feeder 136 may be configured to selectively deposit second feed material 142 to growth surface 120 (e.g., introduce second feed material 142 to melt pool 124).

Unless otherwise indicated, the terms "first," "second," "third," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

In one example implementation, first feed material 140 and second feed material 142 may be different. As one general, non-limiting example, first feed material 140 and second feed material 142 may be structurally different. As one specific, non-limiting example, first feed material 140 may include powder 164 (e.g., metal powder) and second feed material 142 may include wire 166 (e.g., solid metal wire). As one example, metal powder 164 and/or metal wire 166 may be a pure metallic material having no additional filler materials. As another example, metal powder 164 and/or metal wire 166 may include additional materials As another general, non-limiting example, first feed material 140 and second feed material 142 may be compositionally different. As another specific, non-limiting example, first feed material 140 may include first constituent material 168 and second feed material 142 may include second constituent material 170 (FIG. 1). First constituent material 168 and second constituent material 170 may be different. As general, non-limiting examples, first constituent material 168 and/or second constituent material 170 may be metal or metal alloy. As specific, non-limiting examples, first constituent material 168 may include steel, aluminum, titanium, nickel or any suitable refractory metal and/or any alloys based from steel, aluminum, titanium, nickel or any suitable refractory metal. As specific, non-limiting examples, second constituent material 170 may include steel, aluminum, titanium, nickel or any suitable refractory metal and/or any alloys based from steel, aluminum, titanium, nickel or any suitable refractory metal.

In yet another general, non-limiting example, first feed material 140 and second feed material 142 may be structurally and compositionally different. As yet another specific, non-limiting example, first feed material 140 may include powder 164 including first constituent material 168 (e.g., steel powder) and second feed material 142 may include wire 166 including second constituent material 170 (e.g., nickel wire).

Figure 4:
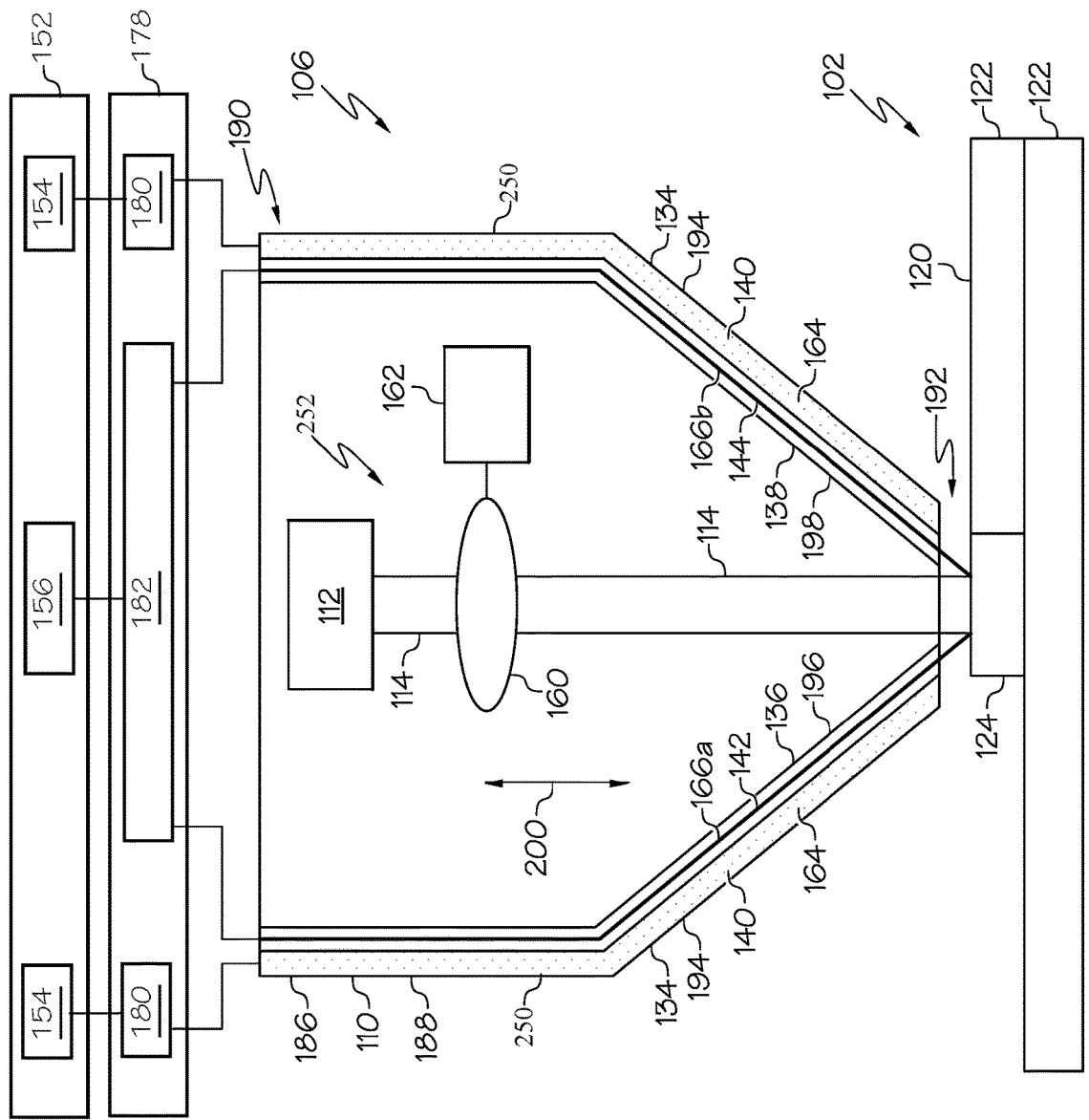
FIG. 4 is a schematic side elevational view, in section, of another embodiment of the disclosed deposition head.

Referring to FIG. 4, and with reference to FIG. 1, in one embodiment of deposition head 106, material feeder 110 may further include third feeder 138 (e.g., material feeder 110 may include first feeder 134, second feeder 136 and third feeder 138). Third feeder 138 may be configured to selectively deposit third feed material 144 to growth surface 120 (e.g., introduce third feed material 144 to melt pool 124).

In one example implementation, at least one of first feed material 140, second feed material 142 and/or third feed material 144 may be different. As one general, non-limiting example, first feed material 140, second feed material 142 and/or third feed material 144 may be structurally different. As one specific, non-limiting example, first feed material 140 may include powder 164 (e.g., metal powder), second feed material 142 may include wire 166 (e.g., solid metal wire) and third feed material 144 may include wire 166 (e.g., solid metal wire). As another specific, non-limiting example, second feed material 142 may include wire 166 (e.g., first wire 166a) (FIG. 4) having a first diameter d1 and third feed material 144 may include wire 166 (e.g., second wire 166b) (FIG. 4) having a second diameter d2. The first diameter d1 and the second diameter d2 may be different. For example, the first diameter d1 of first wire 166a (e.g., second feed material 142) may be a large diameter and the second diameter d2 of second wire 166b (e.g., third feed material 144) may be a small diameter (e.g., the first diameter d1 may be larger than the second diameter d2). As one non-limiting example, a large diameter may include approximately 0.375 inch. As one non-limiting example, a small diameter may include approximately 0.100 inch. Other diameters of metal wire 166 are also contemplated.

As used herein "at least one of" means any combination of single elements or any combination of multiple elements. For example, at least one of X, Y and/or Z may mean X, Y, Z, X and Y, X and Z, Y and Z, or X and Y and Z.

As another general, non-limiting example, at least one of first feed material 140, second feed material 142 and/or third feed material 144 may be compositionally different. As another specific, non-limiting example, first feed material 140 may include first constituent material 168, second feed material 142 may include second constituent material 170 and third feed material 144 may include third constituent material 172 (FIG. 1). At least one of first constituent material 168, second constituent material 170 and/or third constituent material 172 may be different. As general, non-limiting examples, first constituent material 168, second constituent material 170 and/or third constituent material 172 may be metal or metal alloy. As specific, non-limiting examples, third constituent material 172 may include steel, aluminum, titanium, nickel or any suitable refractory metal and/or any alloys based from steel, aluminum, titanium, nickel or any suitable refractory metal.

In yet another general, non-limiting example, at least one of first feed material 140, second feed material 142 and/or third feed material 144 may be structurally and compositionally different. As yet another specific, non-limiting example, first feed material 140 may include, e.g., metal, powder 164 (e.g., metal powder) including first constituent material 168, second feed material 142 may include, e.g., metal, wire 166 (e.g., first wire 166a) having a first diameter d1 and including second constituent material 170, and third feed material 144 may include, e.g., metal, wire 166 (e.g., second wire 166*b*) having a second diameter d2 and including third constituent material 172. As one example, at least one of first constituent material 168, second constituent material 170 and/or third constituent material 172 may be different. As another example, the first diameter d1 and the second diameter d2 may be different. As yet another example, at least one of first constituent material 168, second constituent material 170 and/or third constituent material 172 may be different and the first diameter d1 and the second diameter d2 may be different.

One advantage of introducing different feed materials 118 (e.g., first feed material 140, second feed material 142 and/or third feed material 144) having different structural characteristics is, for example, the ability to increase the flexibility of the type of structural component 174 being formed. As example, wire 166 (e.g., second feed material 142) having a large diameter d1 may be deposited on growth surface 120 to form a large structural component 174 (e.g., a bulk structure). As another example, wire 166 (e.g., third feed material 144) having a small diameter d2 may be deposited on growth surface 120 to form a small structural component 174 (e.g., a detailed structure). As another example, powder 164 (e.g., first feed material 140) may be deposited on growth surface 120 to form a fine structural component 174 (e.g., a fine structural detail).

One advantage of introducing different feed materials 118 (e.g., first feed material 140, second feed material 142 and/or third feed material 144) having different compositional characteristics is, for example, the ability to create one or more particular alloys (e.g., materials composed of two or more metals or a metal and a nonmetal) or superalloys (e.g., a high performance-alloy). As one example, introducing first feed material 140 (e.g., powder 164) of first constituent material 168 (e.g. Titanium) and second feed material 142 (e.g., wire 166) of second constituent material 170 (e.g., Aluminum) into melt pool 124 may mix molten first feed material 146 and molten second feed material 148 to form a particular alloy (e.g., Titanium Aluminide (TiAl)).

As another example, introducing first feed material 140 (e.g., powder 164) of first constituent material 168 (e.g., commercially pure Titanium), second feed material 142 (wire 166) of second constituent material 170 (e.g., Aluminum) and third feed material 144 (wire 166) of third constituent material 172 (e.g., Vanadium) into melt pool 124 may mix molten first feed material 146, molten second feed material 148 and molten third feed material 150 to form a particular alloy (e.g., Ti6Al-4V).

Another advantage of introducing different feed materials 118 (e.g., first feed material 140, second feed material 142 and/or third feed material 144) having different compositional characteristics is, for example, the ability to create article 102 including multiple different metals and/or different alloys. For example, one or more built-up layers 122 of article 102 or certain portions of article 102 may include different metals, different alloys or a combination thereof.

One or more feed materials 118 (e.g., at least one of first feed material 140, second feed material 142 and/or third feed material 144) may be deposited on growth surface 120 (e.g., introduced into melt pool 124) at different feed rates. As used herein, the term "feed rate" generally refers to the amount of the feed material being deposited on the growth surface, for example, based on the volume of the feed material and the introduction speed of the feed material (e.g., volume as a function of time). Further, the feed rates of feed materials 118 may be modified or adjusted during fabrication of article 102. The feed rate of different feed materials 118 may be dictated by, for example, a spot size of electromagnetic energy 114 (e.g., spot size of laser beam 128) on growth surface 120, the dimension D of melt pool 124, the particular structural features 174 being formed, the power level of electromagnetic energy source 112 (e.g., the wattage of laser 126), the constituent materials of feed materials 118 (e.g., first constituent material 168, second constituent material 170 and/or third constituent material 172) and the like.

One advantage of varying the feed rate of feed materials 118 during fabrication of article 102 is, for example, the ability to build-up various structural features 174 of article 102, one or more structural features 174 having a different level of complexity (e.g., size, shape, detail, etc.), in order to maximize the throughput rate of different feed materials 118 and minimize the fabrication time of article 102.

One advantage of introducing different feed materials 118 (e.g., first feed material 140, second feed material 142 and/or third feed material 144) having different compositional characteristics (e.g., different constituent materials) and at different feed rates is, for example, the ability to transition from one constituent material to a different constituent material within article 102 (e.g., from one layer 122 to another layer 122) during fabrication of article 102. For example, one or more of first feed material 140, second feed material 142 and/or third feed material 144 may be used to form a particular (e.g., desired) metal or metal alloy at growth surface 120 (e.g., melt pool 124 may include one or more of molten first feed material 146, molten second feed material 148 and/or molten third feed material 150). During the build-up of article 102 (e.g., during formation of a successive layer 122), the amount (e.g., feed rate) of at least one of feed materials 118 (e.g., second feed material 142) may be varied (e.g., increased or reduced) to create a material transition (e.g., functionally graded transitions) within article 102 during fabrication of article 102. As one non-limiting example, article 102 may transition (e.g., through successive layers 122) from stainless steel to Inconel (e.g., a family of austenite nickel-chromium-based superalloys) by changing the feed rate of different feed materials 118 to form a functionally graded article.

Another advantage of introducing different feed materials 118 (e.g., first feed material 140, second feed material 142 and/or third feed material 144) having different compositional characteristics (e.g., different constituent materials) and at different feed rates is, for example, a significant reduction in waste of feed materials 118 resulting from mixing constituent materials to form a desired alloy. For example, excess powder 164 may not be contaminated by mixing different constituent materials in order to create the desired alloy since the alloy mixing is performed on growth surface 120 (e.g., within melt pool 124).

Referring to FIGS. 3 and 4, and with reference to FIG. 1, deposition head 106 may include optic 160. Optic 160 may be located between electromagnetic energy source 112 and article 102 (e.g., growth surface 120 of article 102). Optic 160 may include any suitable beam forming optics. As one non-limiting example, optic 160 may include precision ground optical glass. As another non-limiting example, optic 160 may include any refractory optical system.

Optic 160 may be configured to form, size and/or shape electromagnetic energy 114 (e.g., laser beam 128), for example, on growth surface 120. For example, optic 160 may at least partially dictate the size and/or shape of electromagnetic energy 114 at growth surface 120. As one example, optic 160 may control the spot shape (e.g., geometry) of electromagnetic energy 114 (e.g., the spot shape of laser beam 128) on growth surface. As non-limiting examples, the spot shape of electromagnetic energy 114

(e.g., laser beam 128) on growth surface may include circular, ovular, square, or rectangular. Other geometric shapes are also contemplated. As another example, optic 160 may control the spot size (e.g., diameter of a circular spot, an inner linear dimension of a square spot, etc.) of electromagnetic energy 114 (e.g., the spot size of laser beam 128) on growth surface 120.

Those skilled in the art will recognize that the power level of electromagnetic energy source 112 (e.g., the wattage of laser 126) may also at least partially dictate the size and/or shape of electromagnetic energy 114 at growth surface 120.

Accordingly, optic 160 may at least partially dictate the size and/or shape of melt pool 124. Those skilled in the art will recognize that the power level of electromagnetic energy source 112 (e.g., the wattage of laser 126) may also at least partially dictate the size and/or shape of melt pool 124.

Figure 6:
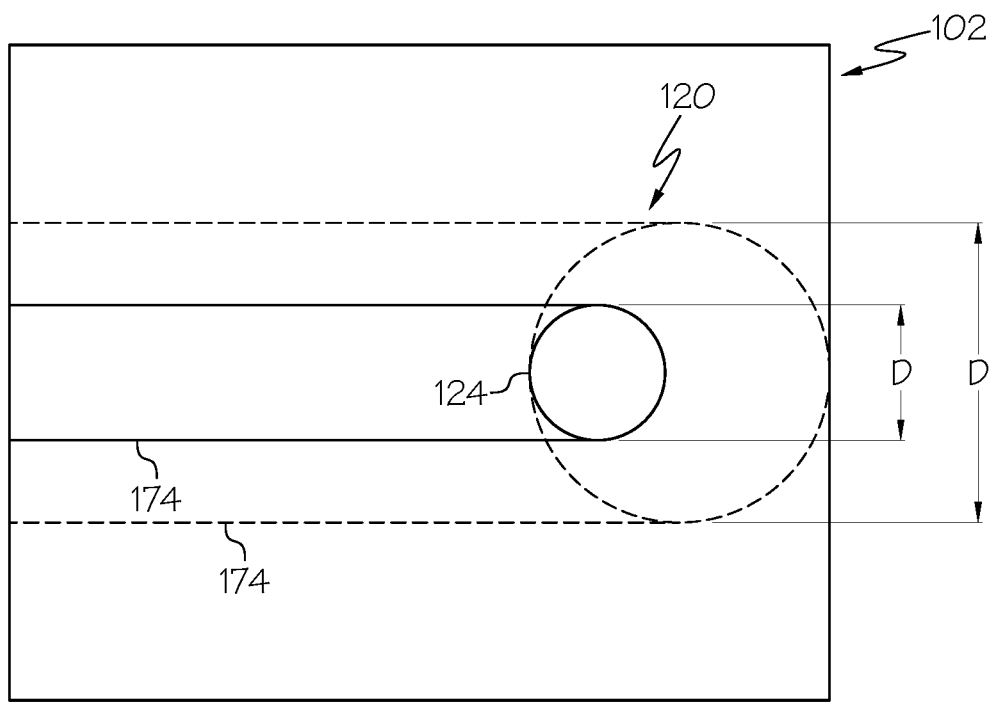
FIG. 6 is a schematic top plan view of one embodiment of a melt pool on a growth surface of the article of FIG. 1.

Referring to FIG. 6, and with reference to FIG. 1, melt pool 124 may define a portion of growth surface 120 to which feed materials 118 are being added in order to build up article 102 (e.g., form a layer 122). Melt pool 124 may include at least one of molten first feed material 146 (e.g., first feed material 140 melted by the directed electromagnetic energy 114), molten second feed material 148 (e.g., second feed material 142 melted by the directed electromagnetic energy 114) and/or molten third feed material 150 (e.g., third feed material 144 melted by the directed electromagnetic energy 114). Melt pool 124 may include a size and/or a shape. The size and/or shape of melt pool 124 may be at least partially dictated by the size and/or shape of the directed electromagnetic energy 114 (e.g., laser beam 128) at growth surface 120.

As one non-limiting example, and as illustrated in FIG. 6, the shape of melt pool 124 may circular. As other non-limiting examples (not explicitly illustrated), the shape of the melt pool 124 may include square, rectangular or ovular. Other geometric shapes of melt pool 124 are also contemplated. The shape of melt pool 124 may be at least partially dictated by the shape of electromagnetic energy 114 (e.g., laser beam 128) at growth surface 120, for example, as controlled by optic 160.

Melt pool 124 may include a size generally corresponding to the size of electromagnetic energy 114 (e.g., laser beam 128) at growth surface 120, for example, as controlled by optic 160. Melt pool 124 may include a dimension D. As one example, the dimension D may be the diameter between outer perimeter edges of a circular melt pool 124, as illustrated in FIG. 6. As another example, the dimension D may be the linear distance (e.g., a major dimension or a minor dimension) between outer perimeter edges of a square, rectangular or ovular melt pool 124.

Figure 5:
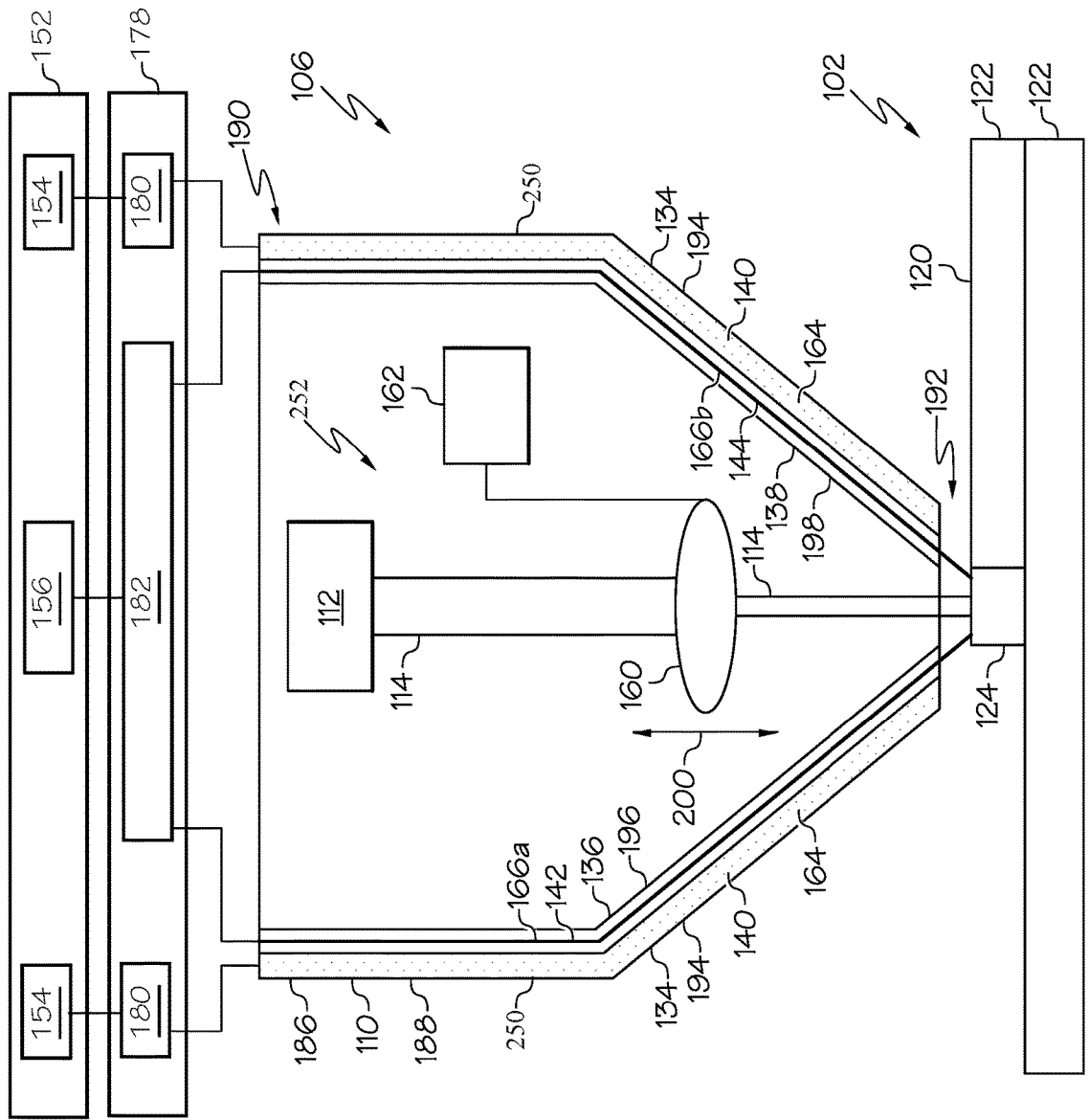
FIG. 5 is another schematic side elevational view, in section, of the deposition head of FIG. 4.

Referring to FIG. 5, optic 160 may be movable relative to electromagnetic energy source 112. As one example, optic 160 may be linearly movable along the Z-axis (FIG. 2), in the direction indicated by arrow 200, as illustrated in FIGS. 4 and 5. As other examples, optic 160 may be also be linearly movable along at least one of the X-axis and/or the Y-axis, a Z-axis, rotatably moveable about at least one of the X-axis, the Y-axis and/or the Z-axis, and/or non-linearly movable. Movement of optic 160 relative to electromagnetic energy source 112 may transform, resize and/or reshape electromagnetic energy 114 (e.g., laser beam 128).

Referring to FIG. 3-6, movement of optic 160 (e.g., changing the location of optic 160 relative to electromagnetic energy source 112 or growth surface 120) (FIGS. 3-5) may adjust the size and/or shape of melt pool 124 (FIG. 6) during fabrication of article 102 or fabrication of a particular structural feature 174 of article 102. As example, with optic 160 in a first position, such as the position illustrated in FIGS. 3 and 4, electromagnetic energy source 112 may direct electromagnetic energy 114 (e.g., laser beam 128) (FIG. 1) having a large spot size and, thus, forming a large melt pool 124, as illustrated in broken lines in FIG. 6. As another example, with optic 160 in a second position, such as the position illustrated in FIG. 5, electromagnetic energy source 112 may direct electromagnetic energy 114 (e.g., laser beam 128) (FIG. 1) having a small spot size and, thus, forming a small melt pool 124, as illustrated in solid lines in FIG. 6.

As one non-limiting example, a large melt pool 124 may include a dimension D of at least approximately 0.375 inch. As another non-limiting example, a large melt pool 124 may include a dimension D of approximately 0.375 inch. As another non-limiting example, a large melt pool 124 may include a dimension D of more than 0.375 inch. As one non-limiting example, a small melt pool 124 may include a dimension D of at least approximately 0.070 inch. As another non-limiting example, a small melt pool 124 may include a dimension D of approximately 0.070 inch. As another non-limiting example, a small melt pool 124 may include a dimension D of more than 0.070 inch.

One advantage of adjusting the size and/or shape of electromagnetic energy 114 at growth surface 120 and, thus, adjusting the size and/or shape of melt pool 124 is, for example, the ability to tailor the size and/or shape of melt pool 124 to fabricate both large (e.g., bulk) structural features 174 and small (e.g., detailed) structural features 174 during the same additive manufacturing process (e.g., using the same deposition head 106 and/or apparatus 104) without sacrificing deposition throughput. As one example, a large melt pool 124 may accommodate a larger amount of feed materials 118 to form large structural features 174. As another example, a small melt pool 124 may accommodate a smaller amount of feed materials 118 to form fine structural features 174.

Referring to FIG. 3-5, and with reference to FIG. 1, deposition head 106 may include optic drive mechanisms 162. Optic drive mechanism 162 may be operatively coupled to optic 160. As general, non-limiting examples, optic drive mechanism 162 may include any suitable mechanical, electro-mechanical, hydraulic or pneumatic mechanism configured to drive motion (e.g., linear, rotatable, and/or non-linear) of optic 160 relative to electromagnetic energy source 112 (and relative to growth surface 120). As specific, non-limiting examples, optic drive mechanism 162 may include a linear drive motor, a worm gear, a belt drive and the like.

Alternatively, optic 160 may be fixed relative to electromagnetic energy source 112 in order to fix the form, size and/or shape of electromagnetic energy 114 (e.g., laser beam 128) at growth surface 120. Optionally, electromagnetic energy source 112 may be linearly movable relative to optic 160 in order to adjust the form, size and/or shape of electromagnetic energy 114 (e.g., laser beam 128) at growth surface 120.

Optionally (e.g., if needed based on potential overheating of optic 160), deposition head 106 may include a cooling mechanism (not shown) associated with optic 160.

Referring to FIGS. 1 and 2, apparatus 104 may include source 152 of feed materials 118. Source 152 may include any suitable repository for storing one or more feed materials 118 to be used by deposition head 106 during fabrication of article 102. For example, source 152 may include at least one of first source 154 of first feed material 140, second source 156 of second feed material 142 and/or third source 158 of third feed material 144. As a non-limiting example, first source 154 may store a supply of powder 164, for example, of first constituent material 168. As another non-limiting example, second source 156 may store a supply of wire 166, for example, of second constituent material 170 and/or having the first diameter d1. As another non-limiting example, third source 158 may store a supply of wire 166, for example, of third constituent material 172 and/or having the second diameter d2.

While the example of FIG. 1 illustrates three sources of feed materials, additional numbers of sources are contemplated depending upon, for example, the number of different types of feed materials being used to fabricate the article by the additive manufacturing techniques described herein. As one example, apparatus 104 may include a suitable number of sources 152 to supply the any suitable number of various structurally and/or compositionally different feed materials 118 used to fabricate article 102.

Apparatus 104 may include delivery mechanism 178. Delivery mechanism 178 may deliver, transfer or distribute feed materials 118 to deposition head 106, for example, from source 152 to material feeder 110. For example, delivery mechanism 178 may include at least one of first delivery mechanism 180 to deliver first feed material 140 from first source 154 to first feeder 134, second delivery mechanism 182 to deliver second feed material 142 from second source 156 to second feeder 136 and/or third delivery mechanism 184 to deliver third feed material 144 from third source 158 to third feeder 138. As a non-limiting example, first delivery mechanism 180 may be configured to transfer powder 164 from first source 154 directly to first feeder 134. As specific, non-limiting examples, first delivery mechanism 180 may be a material auger, a hopper, a pneumatic powder delivery mechanism or other suitable powdered material delivery device. As another, non-limiting example, second delivery mechanism 182 may be configured to transfer wire 166 (e.g., first wire 166*a* having the first diameter d1) from second source 156 directly to second feeder 136. As another, non-limiting example, third delivery mechanism 184 may be configured to transfer wire 166 (e.g., second wire 166*b* having the second diameter d2) from third source 158 directly to third feeder 138. As specific, non-limiting examples, second delivery mechanism 182 and/or third delivery mechanism 184 may be a pinch roller, a wire feeder, a pneumatic wire delivery mechanism or other suitable wire delivery device. Second delivery mechanism 182 and/or third delivery mechanism 184 may also include a wire straightener (not shown).

First delivery mechanism 180 may be configured to accommodate a desired feed rate of first feed material 140. First delivery mechanism 180 may be further be configured to adjust the desired feed rate of first feed material 140. As one non-limiting example, first delivery mechanism 180 may deliver first feed material 140 (e.g., powder 164) at a rate of approximately 6 g/min. Second delivery mechanism 182 may be configured to accommodate a desired feed rate of second feed material 142. Second delivery mechanism 182 may be further be configured to adjust the desired feed rate of second feed material 142. As one non-limiting example, second delivery mechanism 182 may deliver second feed material 142 (e.g., wire 166) at a rate of approximately 2 in/min. Third delivery mechanism 184 may be configured to accommodate a desired feed rate of third feed material 144. Third delivery mechanism 184 may be further be configured to adjust the desired feed rate of third feed material 144. As one non-limiting example, third delivery mechanism 184 may deliver third feed material 144 (e.g., powder 164) at a rate of approximately 5 in/min. Other feed rates for one or more of first feed material 140, second feed material 142 and/or third feed material 144 are also contemplated.

Referring to FIGS. 1 and 2, apparatus 104 may include control unit 176. Control unit 176 may be communication with and configured to control deposition head 106 and build platform 108 during fabrication of article 102. As one example, control unit 176 may be in communication with electromagnetic energy source 112 (e.g., laser beam 128) to initiate and cease emission of electromagnetic energy 114, control the power level of electromagnetic energy source 112 and the like. As another example, control unit 176 may be in communication with deposition head drive mechanism 130 and/or built platform drive mechanism 132 to control the position and/or movement of deposition head 106 and/or build platform 108. As another example, control unit 176 may be in communication with optic drive mechanism 162 to control the position and/or movement of optic 160. As another example, control unit 176 may be in communication with delivery mechanism 178 (e.g., first delivery mechanism 180, second delivery mechanism 182 and/or third delivery mechanism 184) to control the delivery and/or the feed rate of feed materials 118 (e.g., first feed material 140, second feed material 142 and/or third feed material 144) to material feeder 110 (e.g., first feeder 134, second feeder 136 and/or third feeder 138) during fabrication of article 102.

Referring to FIGS. 3-5, deposition head 106 may include an exterior housing 186. Housing 186 may enclose electromagnetic energy source 112, optic 160 and/or optic drive mechanism 162, for example, within an open interior region 252. As one example, housing 186 may define a nozzle body 188 and include first (e.g., upper) end 190 and second (e.g., lower) end 192 opposite first end 190. Housing 186 may be open at second end 192 for deposition of feed materials 118. Electromagnetic energy 114 may exit housing 186 through second end 192.

Nozzle body 188 may define material feeder 110. Feed materials 118 may enter nozzle body 188 at first end 190 and exit at second end 192 for deposition on growth surface 120 (e.g., introduction to melt pool 124). First feeder 134 may include first guide 194 formed within a sidewall 250 forming nozzle body 188. First guide 194 may include, for example, a channel, tube or the like formed through (e.g., extending through) nozzle body 188 from first end 190 to second end 192 of housing 186. First guide 194 may be configured to allow passage of first feed material 140 through nozzle body 188 to growth surface 120. For example, first guide 194 may be configured to allow passage of powder 164. Second feeder 136 may include second guide 196 formed within the sidewall 250 forming nozzle body 188. Second guide 196 may include, for example, a channel, tube or the like formed through (e.g., extending through) nozzle body 188 from first end 190 to second end 192 of housing 186. Second guide 196 may be configured to allow passage of second feed material 142 through nozzle body 188 to growth surface 120. For example, second guide 196 may be configured to allow passage of wire 166, for example, having the first diameter d1 (e.g., first wire 166*a*) (FIGS. 4 and 5). Similarly, third feeder 138 may include third guide 198 formed within the sidewall 250 forming nozzle body 188. Third guide 198 may include, for example, a channel, tube or the like formed through (e.g., extending through) nozzle body 188 from first end 190 to second end 192 of housing 186. Third guide 198 may be configured to allow passage of third feed material 144 through nozzle body 188 to growth surface 120. For example, third guide 198 may be configured to allow passage of wire 166, for example, having the second diameter d2 (e.g., second wire 166*b*) (FIGS. 4 and 5).

The deposition angle (not explicitly illustrated) of feed materials 118 (e.g., one or more of first feed material 140, second feed material 142 and/or third feed material 144) on growth surface 120 (e.g., the angle of introduction into melt pool 124) may affect one or more characteristics of melt pool 124. For example, the deposition angle may affect the quality of the weld puddle (e.g., one or more of molten first feed material 146, molten second feed material 148 and/or molten third feed material 150). The deposition angle of feed materials 118 may be controlled by or at least partially dictated by, for example, the structural configuration of deposition head 106 (e.g., the configuration of nozzle body 188), the orientation of deposition head 106 (e.g., the orientation of second end 192 of nozzle body 188) relative to growth surface 120 and/or melt pool 124 and the like.

Figure 7:
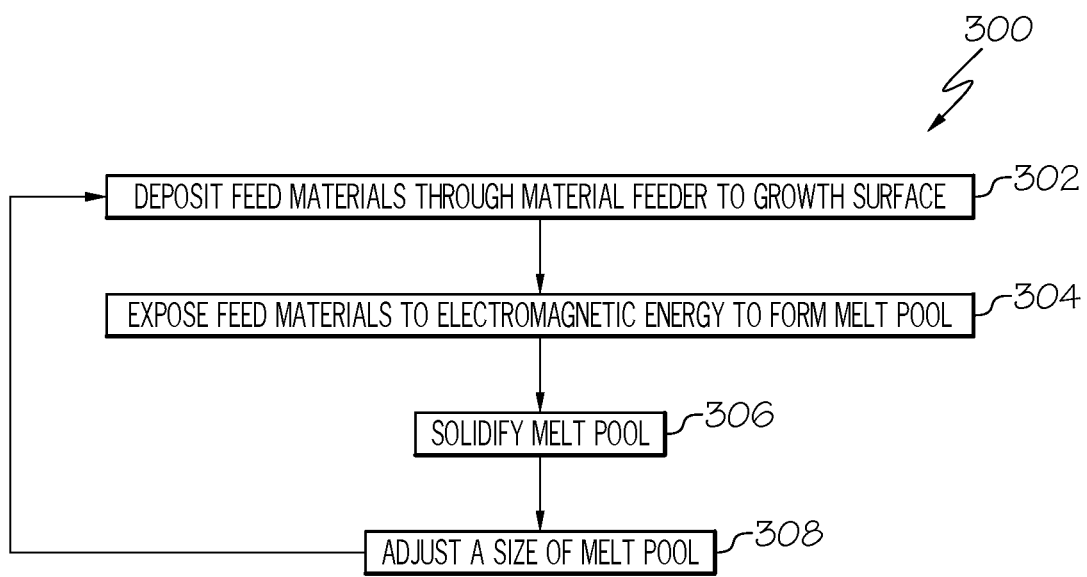
FIG. 7 is a flow diagram of one embodiment of the disclosed method for additively manufacturing a three-dimensional article.

Referring to FIG. 7, one embodiment of method, generally designated 300 is disclosed. Modifications, additions, or omissions may be made to method 300 without departing from the scope of the present disclosure. Method 300 may include more, fewer, or other steps. Additionally, steps may be performed in any suitable order.

Referring to FIG. 7, and with reference to FIG. 1, method 300 may include the step of depositing feed materials 118 through material feeder 110 on growth surface 120, as shown at block 302. As one example, feed materials 118 may include at least one of first feed material 140, second feed material 142 and/or third feed material 144. At least one of first feed material 140, second feed material 142 and third feed material 144 may be different. As one example, at least one of first feed material 140, second feed material 142 and third feed material 144 may be structurally different. As another example, at least one of first feed material 140, second feed material 142 and third feed material 144 may be compositionally different. As yet another example, at least one of first feed material 140, second feed material 142 and third feed material 144 may be structurally different and compositionally different.

Method 300 may include the step of exposing feed materials 118 to electromagnetic energy 114 to form melt pool 124, as shown at block 304. Melt pool 124 may include at least one of a molten first feed material 146, a molten second feed material 148 and a molten third feed material 150. Melt pool 124 may be located at a predetermined location on growth surface 120.

Method 300 may include the step of solidifying melt pool 124, as shown at block 306. Solidification of melt pool 124 may form at least a portion of layer 122 of article 102.

Method 300 may include the step of adjusting a size of melt pool 124, as shown at block 308. As one example, the size of melt pool 124 (e.g., the dimension D of melt pool 124) (FIG. 6) may be adjusted by moving optic 160 relative to electromagnetic energy source 112 (e.g., laser 126) and/or growth surface 120 to modify the size (e.g., spot size) of electromagnetic energy 114 (e.g., laser beam 128) on growth surface 120. As another example, the size of melt pool 124 may be adjusted by adjusting (e.g., modifying) one or more operational parameters of deposition head 106. As one example, the size of melt pool 124 may be adjusted by changing (e.g., increasing or decreasing) the power level of electromagnetic energy source 112. As another example, the size of melt pool 124 may be adjusted by changing the feed rate (e.g., increasing or decreasing) of feed materials 118 (e.g., at least one of first feed material 140, second feed material 142 and/or third feed material 144).

The steps shown at blocks 302, 304, 306 and/or 308 may be repeated at one or more different locations on growth surface 120 to build up structural feature 174 of article 102. Article 102 and/or structural features 174 of article 102 may be formed by a plurality of layers 122. As one example, article 102 may be built up layer-by-layer, generally along the Z-axis (e.g., orthogonal to an X-Y plane of growth surface 120) (FIG. 2).

Figure 8:
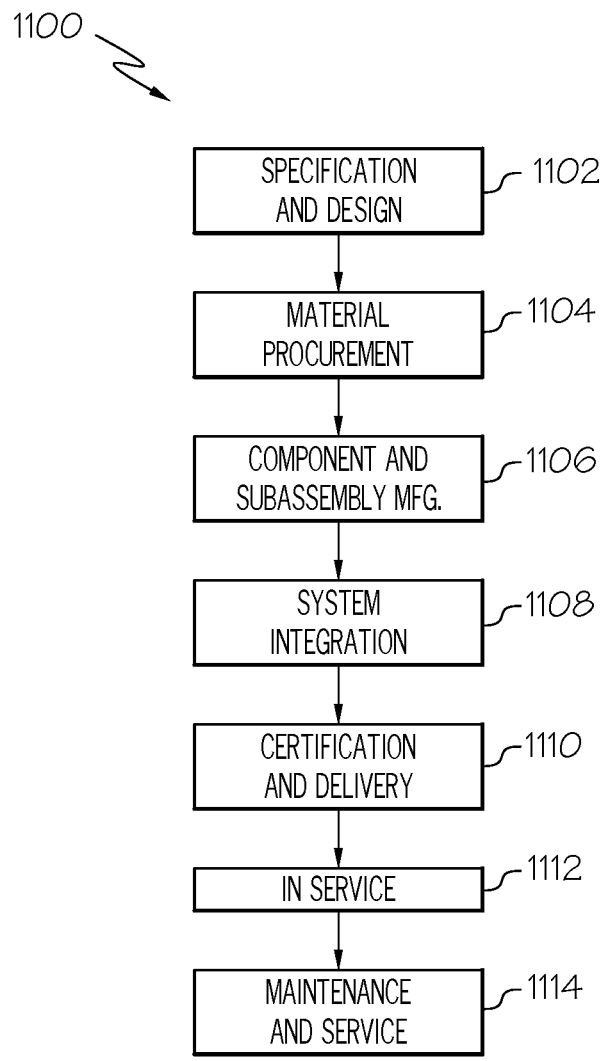
FIG. 8 is a block diagram of aircraft production and service methodology.
Figure 9:
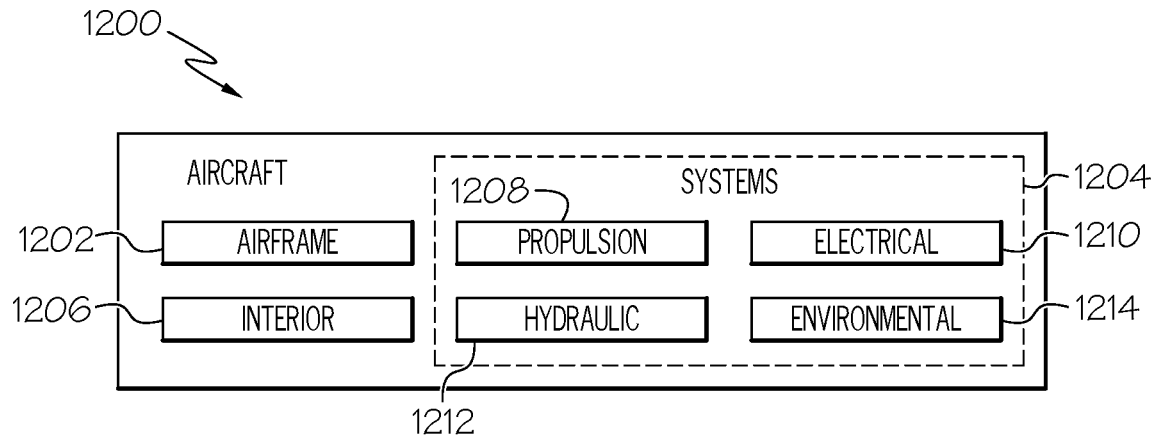
FIG. 9 is a schematic illustration of an aircraft.

Examples of the present disclosure may be described in the context of aircraft manufacturing and service method 1100 as shown in FIG. 8 and aircraft 1200 as shown in FIG. 9. During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive and marine industries.

The apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus and methods, or combination thereof may be utilized during production stages (blocks 1108 and 1110), for example, by substantially reducing the risks associated with counterfeit components in aircraft manufacturing and service processes. Similarly, one or more examples of the apparatus and methods, or a combination thereof, may be utilized, for example and without limitation, while aircraft 1200 is in service (block 1112) and during maintenance and service stage (block 1114).

Thus, the various embodiments of additive manufacturing apparatus 104, deposition head 106 for additive manufacturing and method 300 disclosed herein may utilize and deposit multiple types of feed materials 118 (e.g., feedstock) to influence the fabrication rate of the additive manufacturing process. One or more feed materials 118 (e.g., first feed material 140, second feed material 142, third feed material 144, etc.) may be structurally different (e.g., including powder, wire or different diameters of wire), compositionally different (e.g., including different constituent materials) or a combination of structurally and compositionally different. This will allow the build up (e.g., fabrication) of both fine and large structural features 174 by tailoring the type and amount of feed materials 118 without sacrificing deposition throughput and reducing post-process machining of a three-dimensional article 102 fabricated by the additive manufacturing process. This will also allow simultaneous use of different material types (e.g., alloys) to achieve a functionally graded transition throughout article 102.

Although various embodiments of the disclosed apparatus and methods have been shown and described, modifications may occur to those skilled in the art upon reading the specification. The present application includes such modifications and is limited only by the scope of the claims.

What is claimed is:

1. A method for additively manufacturing a three-dimensional article, said method comprising:
    depositing a powder feedstock through a powder guide of a deposition head on a growth surface in a powdered form;
    depositing a continuous wire feedstock through a wire guide of said deposition head on said growth surface in a solid form;
    exposing at least one of said powder feedstock and said continuous wire feedstock to electromagnetic energy at said growth surface to form a melt pool on said growth surface, wherein said melt pool comprises at least one of said powder feedstock in a molten form and said continuous wire feedstock in a molten form;
    solidifying said melt pool;
    depositing a second continuous wire feedstock through a second wire guide of said deposition head on said growth surface in a solid form; and
    exposing at least one of said powder feedstock, said continuous wire feedstock, and said second continuous wire feedstock to said electromagnetic energy at said growth surface to form said melt pool on said growth surface,
    wherein said melt pool comprises at least one of said powder feedstock in a molten form, said continuous wire feedstock in a molten form, and said second continuous wire feedstock in a molten form, and
    wherein:
        said continuous wire feedstock has a first diameter;
        said second continuous wire feedstock has a second diameter; and
        said first diameter and said second diameter are different.

2. The method of claim 1 further comprising adjusting a size of said melt pool.

3. The method of claim 1 wherein:
    said deposition head comprises a housing, wherein said housing comprises a sidewall that forms a nozzle body, an upper end, an open interior, and an open lower end; and
    exposing at least one of said powder feedstock and said continuous wire feedstock to said electromagnetic energy to form said melt pool comprises:
        directing a laser beam through said open lower end of said housing to said growth surface from a laser, located within said open interior of said housing; and
        irradiating at least one of said powder feedstock and said continuous wire feedstock with said laser beam.

4. The method of claim 3 further comprises selectively positioning an optic, located within said open interior of said housing, to focus said laser beam.

5. The method of claim 4 further comprising linearly moving said optic relative to said laser, using an optic drive mechanism, to adjust a size of said melt pool.

6. The method of claim 3 wherein:
    depositing said powder feedstock comprises passing said powder feedstock through said powder guide formed in said sidewall of said housing and extending from said upper end to said open lower end of said housing; and
    depositing said continuous wire feedstock comprises passing said continuous wire feedstock through said wire guide formed in said sidewall of said housing, separate from said powder guide, and extending from said upper end to said open lower end of said housing.

7. The method of claim 1 further comprising:
    supplying, at a selected first feed rate, said powder feedstock from a source of said powder feedstock to said deposition head using a powder delivery mechanism; and
    supplying, at a selected second feed rate, said continuous wire feedstock from a source of said continuous wire feedstock to said deposition head using a wire feedstock delivery mechanism.

8. The method of claim 1 wherein:
    said powder feedstock comprises a first constituent material;
    said continuous wire feedstock comprises a second constituent material;
    said second continuous wire feedstock comprises a third constituent material; and
    at least any two of said first constituent material, said second constituent material, and said third constituent material are different.

9. The method of claim 1 further comprising:
    depositing a second powder feedstock through a second powder guide of said deposition head on said growth surface in a powdered form; and
    exposing at least one of said powder feedstock, said continuous wire feedstock, and said second powder feedstock to said electromagnetic energy at said growth surface to form said melt pool on said growth surface,
    wherein said melt pool comprises at least one of said powder feedstock in a molten form, said continuous wire feedstock in a molten form, and said second powder feedstock in a molten form.

10. The method of claim 9 wherein:
    said powder feedstock comprises a first constituent material;
    said continuous wire feedstock comprises a second constituent material;
    said second powder feedstock comprises a third constituent material; and
    at least any two of said first constituent material, said second constituent material, and said third constituent material are different.

11. The method of claim 1 wherein said laser comprises a fiber laser.

12. The method of claim 1 wherein said laser is a 5 kW fiber laser.

13. A method for additively manufacturing a three-dimensional article, said method comprising:
    dispensing a powder feedstock through a powder guide on a growth surface in a powdered form;

dispensing a wire feedstock through a wire guide, which is separate from said powder guide, on said growth surface in a solid form;

directing a laser beam to said growth surface;

irradiating at least one of said powder feedstock and said wire feedstock using said laser beam at said growth surface to form a melt pool on said growth surface, wherein said melt pool comprises at least one of said powder feedstock in a molten form and said continuous wire feedstock in a molten form;

dispensing a second wire feedstock through a second wire guide, which is separate from said powder guide and said wire guide, on said growth surface in a solid form; and irradiating at least one of said powder feedstock, said wire feedstock, and said second wire feedstock using said laser beam, emitted by a laser, at said growth surface to form said melt pool on said growth surface, wherein said melt pool comprises at least one of said powder feedstock in said molten form, said continuous wire feedstock in said molten form, and said second continuous wire feedstock in a molten form, and wherein said wire feedstock and said second wire feedstock have different diameters.

14. The method of claim 13 further comprising focusing said laser beam to modify a size of said melt pool.

15. The method of claim 13 wherein said powder feedstock and said wire feedstock are compositionally different.

16. The method of claim 13 further comprising:

dispensing a second powder feedstock through a second powder guide, which is separate from said powder guide and said wire guide, on said growth surface in a powdered form; and irradiating at least one of said powder feedstock, said wire feedstock, and said second powder feedstock using said laser beam at said growth surface to form said melt pool on said growth surface, wherein said melt pool comprises at least one of said powder feedstock in said molten form, said continuous wire feedstock in said molten form, and said second powder feedstock in a molten form.

17. The method of claim 16 wherein:

said powder feedstock and said second powder feedstock are compositionally different; and said wire feedstock is compositionally different than at least one of said powder feedstock and said second powder feedstock.

18. The method of claim 13 wherein:

said wire feedstock and said second wire feedstock are compositionally different; and said powder feedstock is compositionally different than at least one of said wire feedstock and said second wire feedstock.

19. The method of claim 13 wherein said laser comprises a fiber laser.

20. The method of claim 13 said laser is a 5 kW fiber laser.

* * * * *